Aug. 13, 1929.  J. H. FOX  1,724,704
PROCESS AND APPARATUS FOR SURFACING SHEET GLASS
Filed Oct. 29, 1923  6 Sheets-Sheet 1
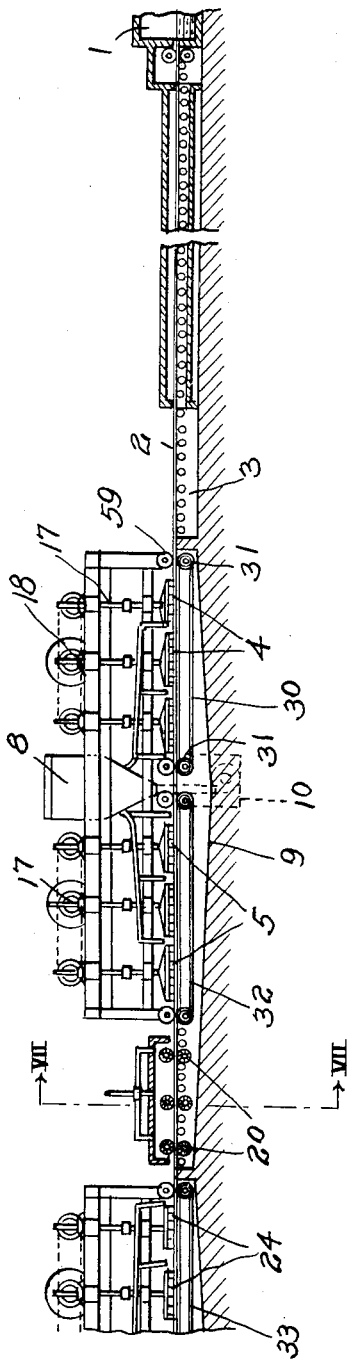
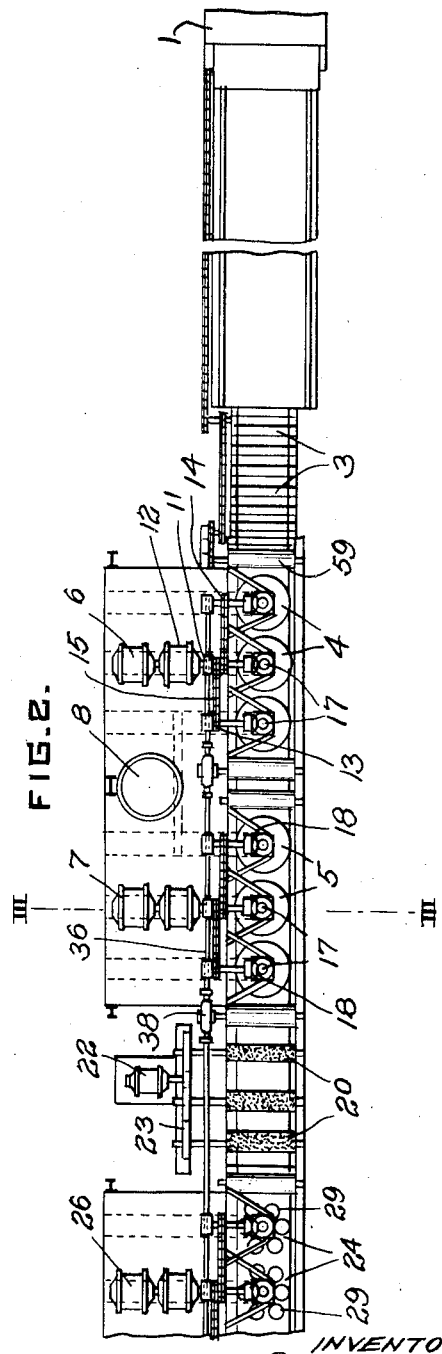
INVENTOR
John H. Fox
by
James C. Bradley
atty.

Aug. 13, 1929.  J. H. FOX  1,724,704
PROCESS AND APPARATUS FOR SURFACING SHEET GLASS
Filed Oct. 29, 1923  6 Sheets-Sheet 2
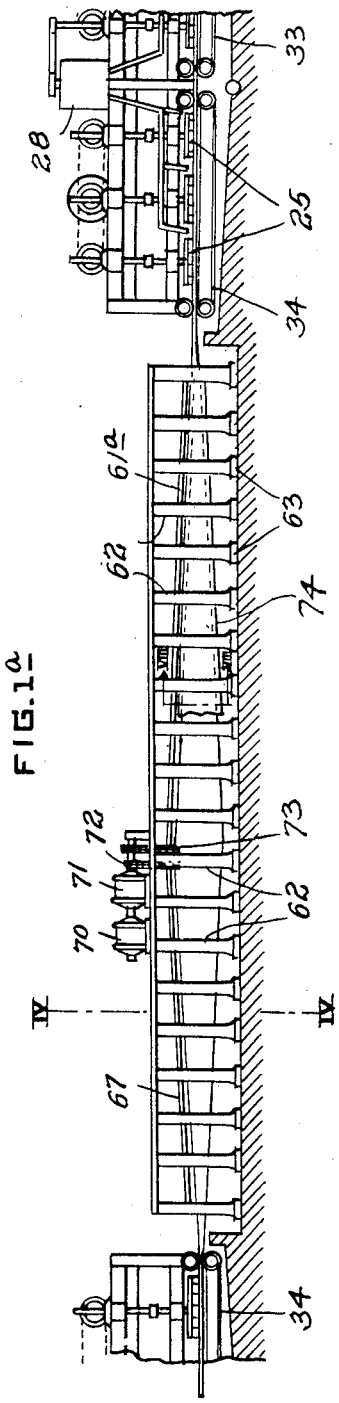
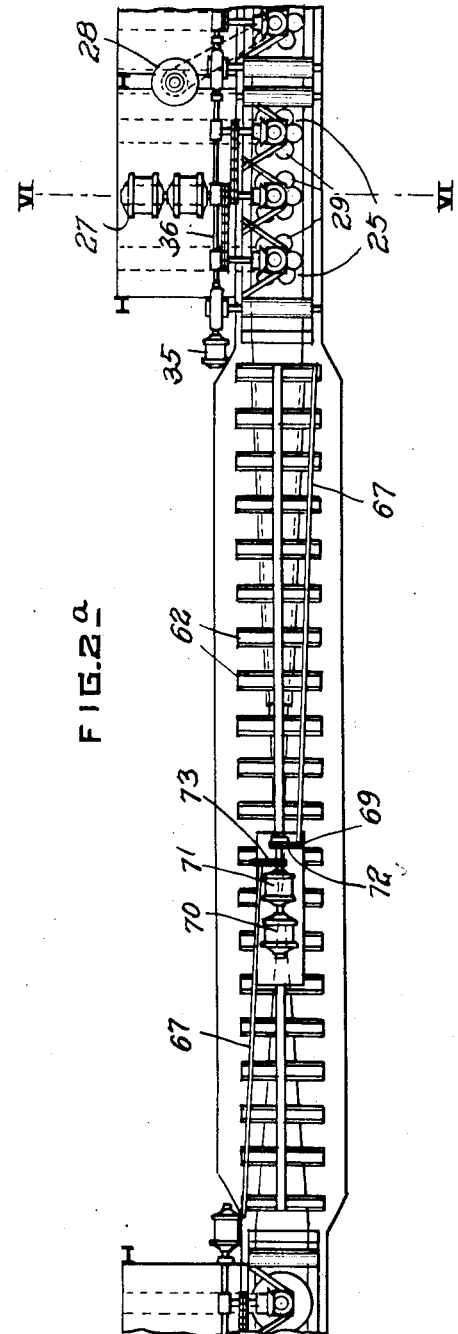
INVENTOR
John H. Fox Aug. 13, 1929. J. H. FOX 1,724,704
PROCESS AND APPARATUS FOR SURFACING SHEET GLASS
Filed Oct. 29, 1923 6 Sheets-Sheet 3
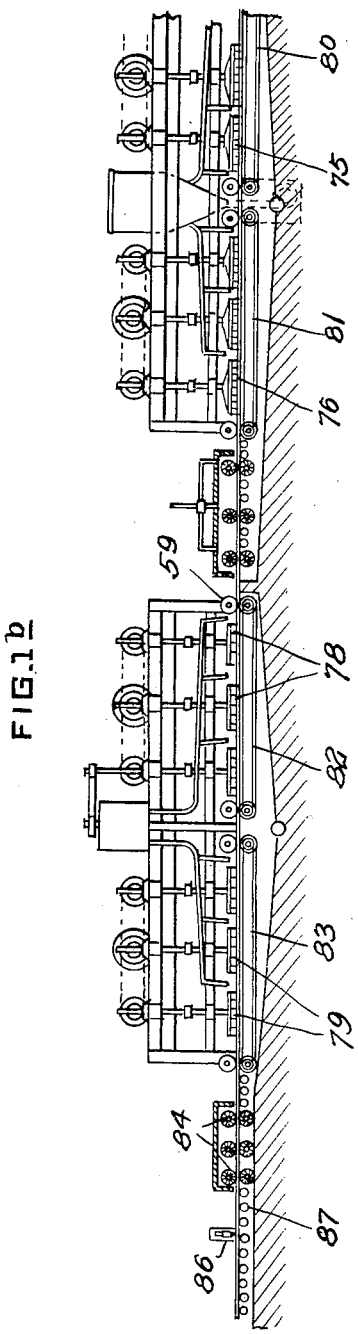
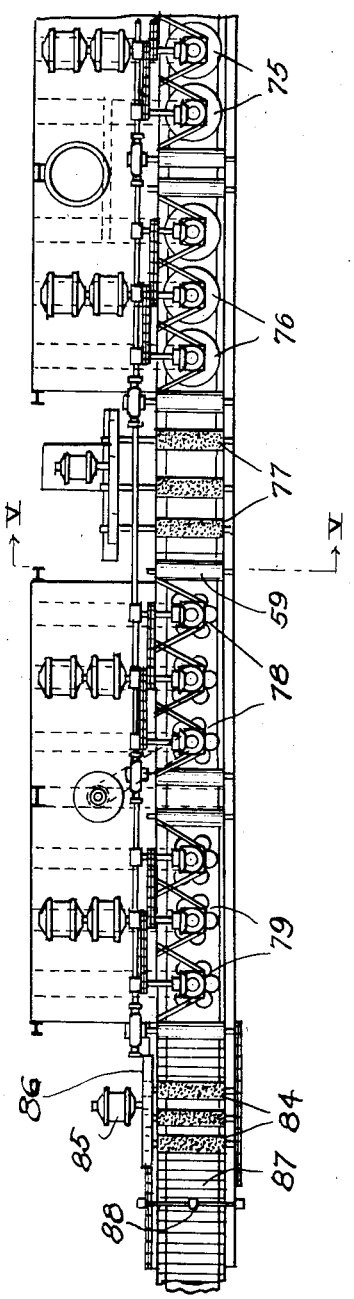
INVENTOR
John H. Fox
by
James L. Bradley
atty.

Aug. 13, 1929.  J. H. FOX  1,724,704
PROCESS AND APPARATUS FOR SURFACING SHEET GLASS
Filed Oct. 29, 1923   6 Sheets-Sheet 4
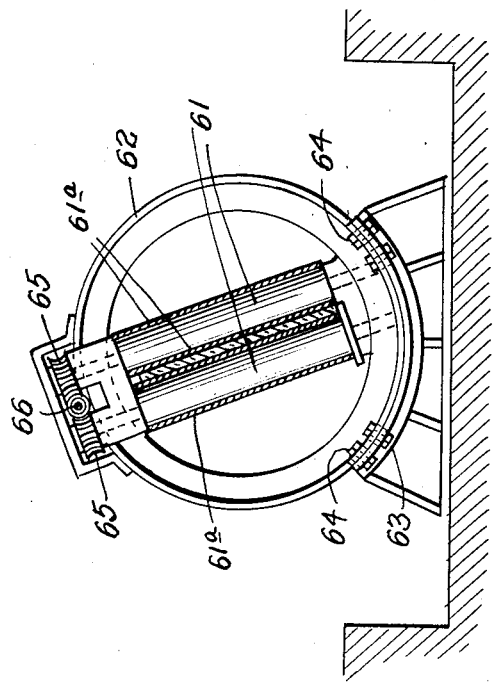
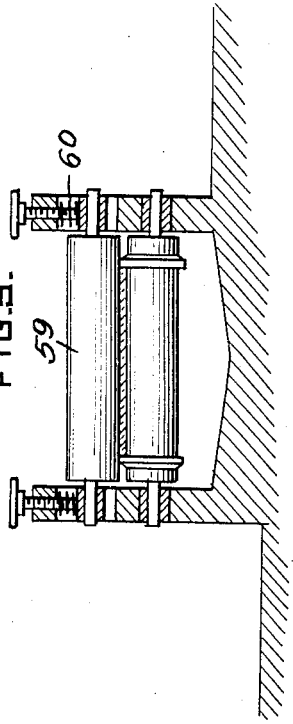
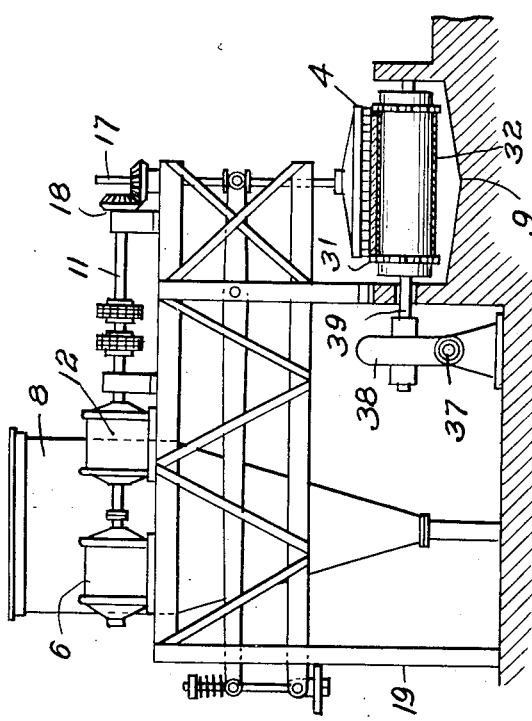

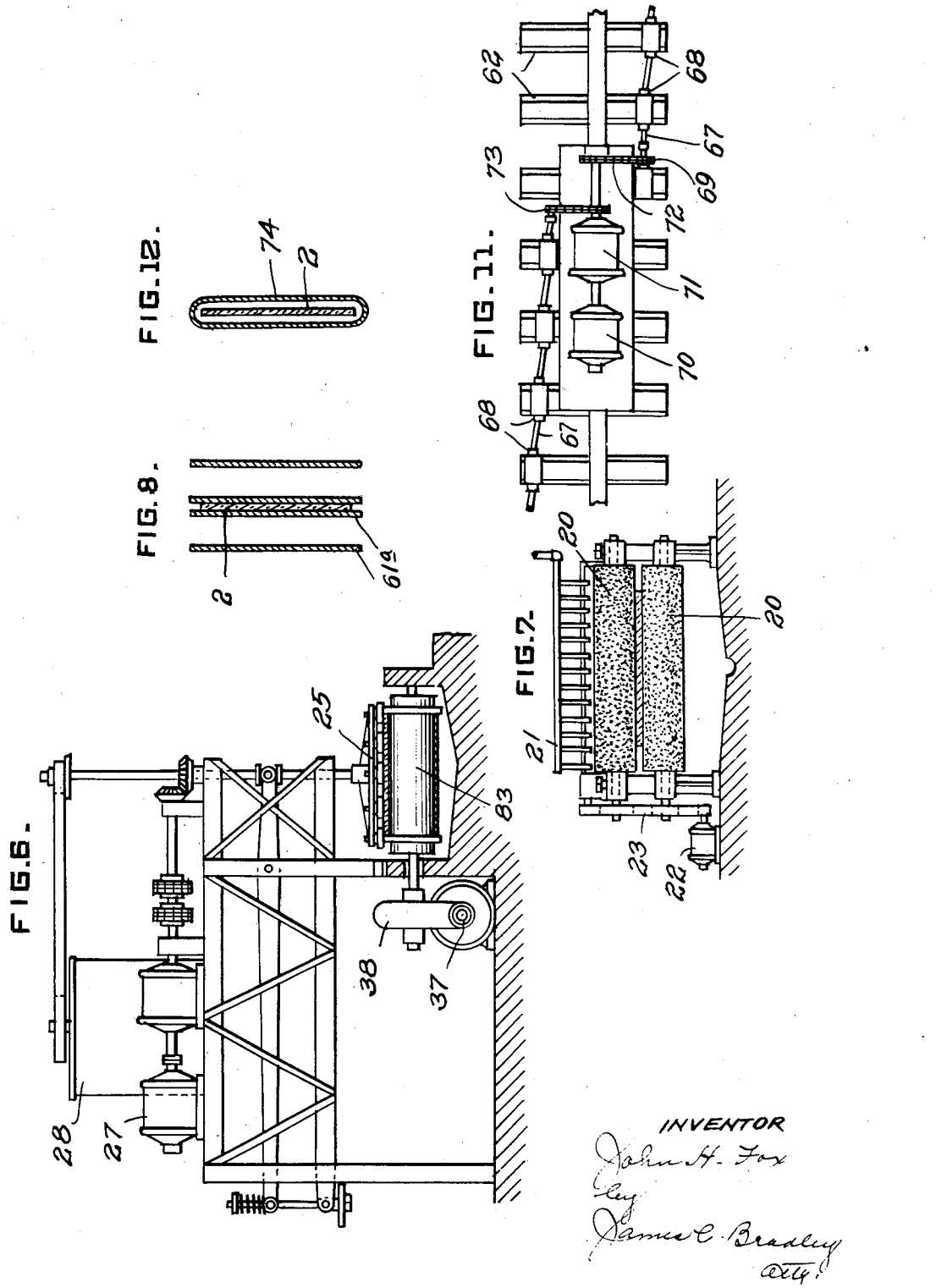

Aug. 13, 1929.   J. H. FOX   1,724,704
PROCESS AND APPARATUS FOR SURFACING SHEET GLASS
Filed Oct. 29, 1923   6 Sheets-Sheet 6
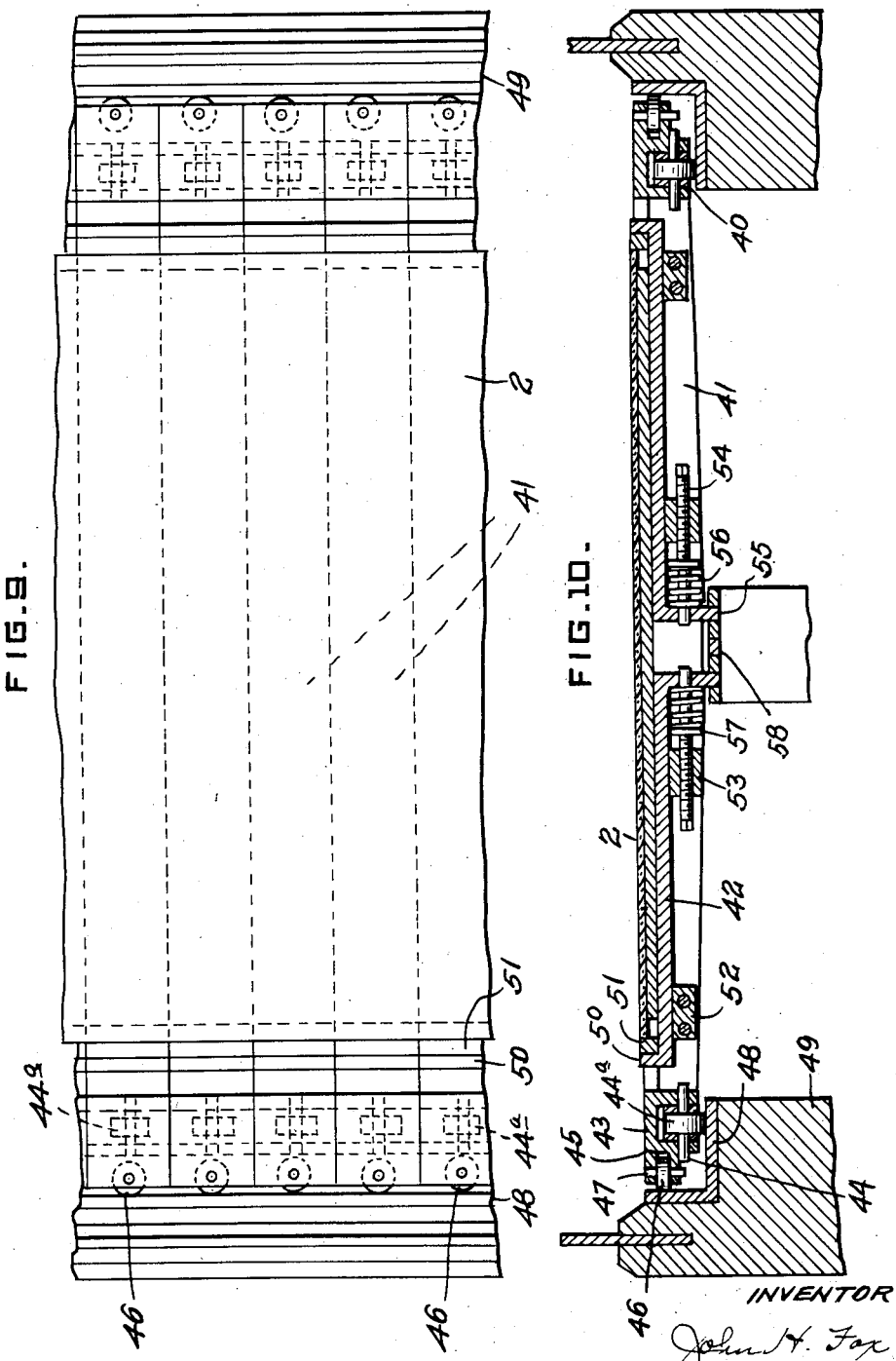

Patented Aug. 13, 1929.

1,724,704

UNITED STATES PATENT OFFICE.

JOHN H. FOX, OF PITTSBURGH, PENNSYLVANIA, ASSIGNOR TO PITTSBURGH PLATE GLASS COMPANY, A CORPORATION OF PENNSYLVANIA.

PROCESS AND APPARATUS FOR SURFACING SHEET GLASS.

Application filed October 29, 1923. Serial No. 671,399.

The invention relates to a process and apparatus for surfacing sheet glass which is made and annealed in a continuous sheet or ribbon. It has for its principal object the cheapening of the surfacing operation (grinding and polishing) by eliminating the requirement for cutting the glass into sections, turning them upside down and securing them to the carrier or table as has heretofore been done. One embodiment of the invention is illustrated in the accompanying drawings wherein:

Figures 1, 1ª and 1ᵇ together constitute a side elevation of the apparatus. Figs. 2, 2ª and 2ᵇ are together a plan view of the apparatus. Figs. 3, 4, 5, 6, 7 and 8 are sections on the lines III—III, IV—IV, V—V, VI—VI, VII—VII and VIII—VIII of Fig. 2. Figs. 9 and 10 are enlarged detail views of the carrier or table, Fig. 9 being a partial plan view and Fig. 10 being a transverse section. Fig. 11 is an enlarged side elevation showing the driving means for the turning rolls. And Fig. 12 is a section through a modification.

The glass sheet or ribbon which is to be surfaced is preferably formed from the tank in the manner indicated in the application of Frederick Gelstharp, Serial No. 656,441, and after its formation is passed through a leer, the outlet end of which is indicated by the reference numeral 1, such leer also being of the roller type shown in the Gelstharp application referred to. After the ribbon 2, which is now set and fully annealed emerges from the leer, it passes over the inspection table 3 and then beneath the series of grinding runners 4 and 5, the runners 4 constituting one set and being driven from the motor 6 and the runners 5 constituting a second set and being driven from the motor 7. The number of runners used will ordinarily be much greater than six, such number being shown merely for simplicity in illustration. These runners will be of the ordinary type, preferably having cast iron faces and being supplied with a mixture of sand and abrasive from the sand grader 8. Different grades will be supplied from this grader to the successive runners, ranging from coarse to fine and the used abrasive and water will drain through the ditch 9 into the pit 10, from which it is pumped up into the grader for reuse. In ordinary practice the last two or three of the grinders will be supplied with a mixture of emery and water instead of sand and water in order to give the desired "smooth". The motor 6 drives the shaft 11 through the intermediary of reducing gearing in the casing 12 and the other shafts 13 and 14 are driven from the shaft 11 by means of the chains 15 and 16. The runner spindles 17 are driven from the shafts 13, 11 and 14 by means of the bevel gearing 18 as indicated in Fig. 3, and the runner shafts are supported in a suitable framework 19 as also indicated in Fig. 3. The other set of three grinders 5 are similarly driven from the motor 7.

After the glass is ground, it passes beneath the pairs of cleaning brushes 20 to which water is supplied from the transverse pipes 21 having depending spray pipes as indicated in Fig. 7. The brushes are driven from a motor 22 by means of a belt 23 passing around pulleys arranged upon the ends of the roll shafts.

The glass then passes beneath the two sets of polishing runners 24 and 25 which number, as in the case of the grinders, will ordinarily be greater than the six shown. These polishing runners are driven in sets of three from the motors 26 and 27, the method of driving, and the mounting of the runners being similar to that described in connection with the grinders. A mixture of rouge and water is supplied to the various machines from the tank 28. The runner frames each carry a plurality of runner blocks 29, the number illustrated being six, free to rotate on their individual spindles and having their faces covered with the usual polishing felt.

The glass ribbon is carried and supported beneath the first set of grinding runners 4 by means of an endless carrier 30 passing around the sprocket wheels 31 at the ends of the carrier. Similar endless carriers 32, 33 and 34 are provided beneath the second set of grinding runners 5 and the two sets of polishing runners 24 and 25, and all of these carriers are driven from the motor 35 (Fig. 2ª). A line shaft 36 from this motor extends along the side of the series of polishers and grinders and power is transmitted from this shaft to each of the shafts which carry the sprockets 31 upon which the endless carriers are mounted. The gear reduction between the shaft 36 and the shafts carrying the sprockets comprises in each case a worm 37 as indicated in Fig. 3 which drives a worm wheel in the casing 38, such worm wheel being keyed to the shaft 39 on which the sprockets 31 are mounted.

The construction of the endless grinding and polishing carriers or tables 30, 32, 33 and 34 is shown in Figs. 9 and 10, such construction being the same as that shown and described in detail in a joint application of William Owen and myself, Serial No. 636,481. These tables are made up of sprocket chains 40 which carry transverse plates 41 preferably U shaped in cross section, together with the pairs of clamping members 42 for gripping the opposite edges of the sheet or ribbon 2. These sprocket chains at each side of the table are made up of pairs of links carrying upon their pintles 44 the rollers 44ª. The chains are mounted in the U shaped recesses 43 provided in the ends of the transverse plates 41, the pintles 44 extending through the side walls of these recesses as indicated in Fig. 10. The ends of the plates 41 are also provided with U shaped recesses 45, in which are mounted the side thrust rollers 46 carried by the pintles 47. The rollers 44ª and 46 engage the angle guide 48, which is rigidly mounted in the upper edges of the concrete wall 49. In this manner the table sections or plates are rigidly supported or guided with their upper surfaces in alignment with each other, while they are passing beneath the grinding or polishing runners.

The clamping bars 42 are provided at their outer edges with the upturned flanges 50 projecting through slots in the plates 41, and provided on their inner sides with wood blocks 51 for engaging the glass. The bars are guided in bearing members 52 secured to the bottoms of the plates 41 and also in other bearing members 53 secured to the bottoms of said plates which bearings also carry the adjusting screws 54. The bars 42 are provided at their inner ends with flanges 55 which are pressed yieldingly towards each other with springs 56 engaging collars 57 on the adjusting screws 54. The clamping pressure which the bars exert on the edges of the glass ribbon 2 is regulated by adjusting the screws 54 which changes the compression of the springs 56. In order to spread the flanges 50 apart at the entrance end of the table, the wedge or cam 58 is provided in position to engage the lower edges of the flanges 55. After the flanges 55 are carried past the cams 58, the springs 56 carry the bars 42 inward so that the edges of the glass are clamped by the flanges 50. A similar spreading device is employed at the discharge end of each of the endless tables or carriers in order to release the ribbon as it passes off of the table.

In order that the glass may be in proper engagement with the table when it is engaged by its clamps, a presser roll 59 (Fig. 5) yieldingly pressed down by springs 60 is preferably employed at the receiving end of each of the tables and also between the sets of grinders and polishers. These rolls and also the grinding and polishing tables or carriers may be covered with a yielding material such as cloth or rubber in order to lessen the danger of breakage and give a better contact between the rolls and the glass and the table and the glass.

After the glass ribbon has passed the polishing runners 25, it is turned 180 degrees to bring its lower side up preliminary to grinding and polishing such lower surface by means of apparatus identical in construction with that just described for grinding and polishing the first side of the ribbon. This twisting of the sheet to bring its other side up is accomplished by means of the pairs of rolls 61. The succeeding passes between these rolls are so positioned that each gives the sheet a slight turn from its previous position, the amount of turn being made relatively small and the large number of sets of rolls being employed in order to reduce the strain upon the glass to a minimum. Each pair of rolls is mounted in an annular frame 62 which is in turn mounted for adjustment circumferentially in the semi-annular base 63, the opposing flanges of the members 62 and 63 being slotted to receive the bolts 64, so that the angle of adjustment of the rolls may be varied to suit requirements. In order to guide the glass between the pairs of rolls and prevent any interruption in case the glass breaks, the pairs of endless belts 61ª are employed on opposite sides of the glass, such belts passing between all the pairs of rolls and around the rear thereof as indicated in Figs. 4 and 8. The rolls are mounted in suitable bearings carried by the frame 62 and are provided at their ends with the worm wheels 65 driven by a worm 66. The worms 66 are coupled together in series by the shaft sections 67 which have at each end the universal joint 68 so that the line shaft which is thus formed is made perfectly flexible to take care of the various angles of adjustment of the sets of twisting rolls. The end line shaft section carries a sprocket wheel 69 which is driven from the motor 70 through the reducing gearing in the casing 71 and the sprocket chain 72. The foregoing provides the drive for the first half of the series of sets of rolls during which the sheet is turned through an angle of 90 degrees. The drive for the second half of the series of rolls is similar to that just described being secured by means of the flexible line shaft 67 driven from the motor 70 by means of the sprocket chain 73 which passes around suitable sprockets on the driving shaft and flexible line shaft.

In order to guide the ribbon between the sets of rolls, a guard casing 74, such as indicated in Fig. 12 may be used instead of the endless belts 61ª. This casing is preferably of metal whose sides fit closely along the sides of the ribbon 2, the clearance being such that the ribbon will pass freely through without binding. The interior of the casing is perfectly smooth to avoid any tendency of the glass to catch upon or be retarded by the casing. This casing is useful in guiding the ribbon when the operation is first started and also in case of breakage which holds the broken glass in position and guides the ribbon so that the operation may be continued without interruption.

When the sheet has passed the sets of twisting rolls 61, it is reversed with the side which has been ground and polished down and the rough side up. The sheet now passes beneath the two sets of grinding rolls 75 and 76, the cleaning brushes 77 and the two sets of polishing runners 78 and 79 being ground and polished as heretofore described in connection with the first side. In this movement the ribbon is carried upon the endless tables 80, 81, 82 and 83, and it will be understood that the construction of the grinders and polishers, the tables and the driving mechanism therefor is the same as heretofore described in connection with the grinding and polishing of the first side of the ribbon. After the ribbon emerges from the last set of polishers, it passes beneath the cleaning brushes 84 driven from the motor 85 by means of the belt 86, thus completing the surfacing operation. The ribbon now passes on to the table 87 which has a roller surface and is cut into lengths of any desired dimension by a hand operated tool or a cutting off device 88.

What I claim is:

1. A process for surfacing a continuous ribbon of glass which consists in carrying the sheet beneath a series of surfacing machines to smooth the upper side, then twisting the ribbon gradually through 180 degrees to bring its other surface up, and carrying the ribbon beneath a second series of surfacing machines to smooth such other surface.

2. In combination in apparatus for surfacing a continuously formed and annealed ribbon of glass, a series of surfacing machines, means for carrying the ribbon beneath the surfacing machines, means following the surfacing machines for gradually turning the ribbon through 180 degrees to bring its lower side up, a second series of surfacing machines following the means for turning the ribbon, and means for carrying the ribbons beneath the second set of surfacing machines.

3. In combination in apparatus for surfacing a continuously formed and annealed ribbon of glass, a series of surfacing machines, means for carrying the ribbon beneath the surfacing machines, a series of pairs of rolls following the surfacing machines with their passes arranged at increasing angles through 180 degrees for gradually turning the ribbon so as to bring its lower surface up, a second set of surfacing machines following said series of rolls, and means for carrying the ribbon beneath the second set of surfacing machines.

4. In combination in apparatus for surfacing a continuously formed and annealed ribbon of glass, a series of surfacing machines, means for carrying the ribbon beneath the surfacing machines, a series of pairs of rolls following the surfacing machines with their passes arranged at increasing angles through 180 degrees for gradually turning the ribbon so as to bring its lower surface up, means for driving said rolls, and a second set of surfacing machines following said series of rolls, and means for carrying the ribbon beneath the second set of surfacing machines.

5. In combination in apparatus for surfacing a continuously formed and annealed ribbon of glass, a series of surfacing machines, means for carrying the ribbon beneath the surfacing machines, a series of pairs of rolls following the surfacing machines with their passes arranged at increasing angles through 180 degrees for gradually turning the ribbon so as to bring its lower surface up, tubular guard members surrounding the ribbon intermediate the pairs of rolls, means for driving said rolls, a second set of surfacing machines following said series of rolls, and means for carrying the ribbon beneath the second set of surfacing machines.

6. In combination with glass surfacing apparatus, means for twisting a continuous ribbon of glass to be surfaced from one plane to another comprising a series of pairs of rolls with their passes arranged at increasing angles between the two planes for gradually turning the ribbon from the one plane to the other.

7. In combination with glass surfacing apparatus, means for twisting a continuous ribbon of glass to be surfaced from one plane to another comprising a series of pairs of rolls witih their passes arranged at increasing angles between the two planes for gradually turning the ribbon from the one plane to the other, and a pair of endless belts for guiding and supporting the glass intermediate the pairs of rolls such belts having their front flights between the glass and the rolls, and their rear flights behind the rolls.

8. In combination with glass surfacing apparatus, means for twisting a continuous ribbon of glass to be surfaced from one plane to another comprising a series of pairs of rolls with their passes arranged at increasing angles between the two planes for gradually turning the ribbon from one plane to the other, and guide means for the glass on opposite sides thereof intermediate the pairs of rolls.

In testimony whereof, I have hereunto subscribed my name this 24th day of Oct., 1923.

JOHN H. FOX.